(12) United States Patent
Jäderberg et al.

(10) Patent No.: US 7,981,350 B2
(45) Date of Patent: Jul. 19, 2011

(54) METHOD AND APPARATUS FOR INJECTION MOLDING HAVING AN INDUCTIVE COIL HEATER

(75) Inventors: Jan Jäderberg, Spånga (SE); Stefan Olin, Sollentuna (SE)

(73) Assignee: Thermal Cyclic Technologies TCTech I Stockholm AB, Spanga (SE)

( * ) Notice: Subject to any disclaimer, the term of this patent is extended or adjusted under 35 U.S.C. 154(b) by 539 days.

(21) Appl. No.: 12/086,774

(22) PCT Filed: Dec. 20, 2006

(86) PCT No.: PCT/SE2006/001445
§ 371 (c)(1),
(2), (4) Date: Aug. 25, 2008

(87) PCT Pub. No.: WO2007/073291
PCT Pub. Date: Jun. 28, 2007

(65) Prior Publication Data
US 2009/0068306 A1  Mar. 12, 2009

Related U.S. Application Data

(60) Provisional application No. 60/773,324, filed on Feb. 15, 2006.

(30) Foreign Application Priority Data

Dec. 22, 2005  (EP) ..................................... 05112706

(51) Int. Cl.
*B29C 45/73* (2006.01)
(52) U.S. Cl. ..... 264/328.16; 425/174.8 R; 425/174.8 E; 425/547; 425/548
(58) Field of Classification Search ........... 425/174.8 R, 425/174.8 E, 547, 548; 264/328.16
See application file for complete search history.

(56) References Cited

U.S. PATENT DOCUMENTS

| | | | |
|---|---|---|---|
| 4,563,145 A | 1/1986 | de Meij | |
| 5,808,281 A | 9/1998 | Matsen et al. | |
| 5,837,183 A | 11/1998 | Inoue et al. | |
| 7,132,632 B2 * | 11/2006 | Huang | 219/635 |
| 2003/0215540 A1 | 11/2003 | Asai | |
| 2003/0234470 A1 | 12/2003 | Haan et al. | |
| 2004/0009260 A1 | 1/2004 | Gabriel | |
| 2004/0188427 A1 | 9/2004 | Huang | |
| 2005/0053691 A1 | 3/2005 | Gabriel | |

(Continued)

FOREIGN PATENT DOCUMENTS

EP  0146191 A1  6/1985

(Continued)

*Primary Examiner* — Tim Heitbrink
(74) *Attorney, Agent, or Firm* — Birch, Stewart, Kolasch & Birch, LLP

(57) ABSTRACT

An injection-moulding device is disclosed, comprising at least first and second mould parts, defining a mould cavity, wherein at least one of the mould parts comprises heating means, for heating the mould part in the vicinity of a mould cavity surface, said heating means comprising an inductive coil having a plurality of windings and being powered by an oscillator. The mould part comprises a top member, at the mould cavity surface, and, beneath the top member, a carrier member comprising grooves for taking up said coil windings, wherein the top member resistivity is lower than $1.5*10^{-6}$ $\Omega m$, the top member relative magnetic permeability is lower than 10, the carrier member resistivity is higher than $20*10^{-6}$ $\Omega m$, and the carrier member relative magnetic permeability is higher than 50.

18 Claims, 4 Drawing Sheets

U.S. PATENT DOCUMENTS

| | | |
|---|---|---|
| 2006/0246166 A1 | 11/2006 | Hsu et al. |
| 2008/0303194 A1* | 12/2008 | Anbarasu et al. .............. 264/403 |
| 2009/0068306 A1* | 3/2009 | Jaderberg et al. ............. 425/547 |
| 2009/0115104 A1* | 5/2009 | Anbarasu et al. .............. 264/319 |
| 2009/0220723 A1* | 9/2009 | Jaderberg et al. ............. 428/64.2 |
| 2009/0239023 A1* | 9/2009 | Olin et al. .................... 428/64.2 |

FOREIGN PATENT DOCUMENTS

| | | |
|---|---|---|
| EP | 0153075 A2 | 8/1985 |
| EP | 0505738 A1 | 9/1992 |
| EP | 0864411 A1 | 9/1998 |
| EP | 1022109 A1 | 7/2000 |
| GB | 2081171 A | 2/1982 |
| JP | 60-96427 A | 5/1985 |
| JP | 62-59014 A | 3/1987 |
| JP | 63-78720 A | 4/1988 |
| JP | 3-10811 A | 1/1991 |
| JP | 3-58809 A | 3/1991 |
| JP | 6-8250 A | 1/1994 |
| JP | 2002-79559 A | 3/2002 |
| JP | 2002-264191 A | 9/2002 |
| JP | 2003-311799 A | 11/2003 |
| JP | 2005-335234 A | 12/2005 |

* cited by examiner

METHOD AND APPARATUS FOR INJECTION MOLDING HAVING AN INDUCTIVE COIL HEATER

CROSS REFERENCE TO RELATED APPLICATIONS

This application claims benefit from European Patent application No. EP-05112706.6, filed Dec. 22, 2005, and U.S. provisional patent application No. US-60/773,324, filed Feb. 15, 2006, both incorporated herein by reference.

TECHNICAL FIELD

The present invention relates to an injection-moulding device, a method for injection-moulding, and to information carriers and lightguide plates produced by means of such a device or such a method.

BACKGROUND OF THE INVENTION

Known injection-moulding devices, for producing objects of different kinds, usually comprise two main mould parts for defining a cavity. A first, fixed part has an injection nozzle, injecting the liquid moulding compound, typically a warm resin such as polycarbonate, into the cavity. A second mould part is movable in relation to the fixed mould part, such that it can be moved to open the cavity. The volume of the mould cavity, for forming the object, may be arranged in either or both of the mould parts. In so-called injection compression injection-moulding devices there may also be a third part defining the cavity.

When forming an object, liquid resin from an extruder is injected into the mould cavity through the nozzle when the two mould parts are in a closed or nearly closed state. As soon as an adequate amount of resin has been injected, the mould parts may be closed by pushing the movable part towards the fixed part, which allows a fine structure to be formed on an object surface, the structure being an inverse of a structure formed on one of the mould parts. E.g. if a CD (Compact Disc) is produced, this structure comprises a digital pattern intended, after several post-processing steps, to be readable by means of a laser pick-up system.

The mould parts are then cooled, usually by means of cooling water flowing in integrated cooling ducts, such that the resin in the cavity is solidified. Subsequently, the mould parts are separated by retracting the movable mould part, and the finished object can be removed.

The injected resin should be warm enough to allow the resin to completely fill the cavity and any desired surface structure to be reproduced before the resin reaches its glass transition region. This imposes limitations upon the temperature of the moulded resin when injected into the cavity as well as upon the temperature of the cooling water. When injected into the cavity, the resin temperature must be substantially higher than the upper range of the glass transition region. When the injection phase is completed and the cooling phase follows, at least some parts of the mould need be cooled from a starting temperature which is quite high. This is done with cooling water, the temperature of which must not be so low that the resin is solidified too early. The cooling water temperature may be 115° C. in a typical DVD-R manufacturing process. Therefore, the time needed for cooling is quite long. The total cycle time needed to injection mould e.g. a DVD-R (Digital Versatile Disc, Recordable) substrate is about 3 seconds. The cooling water flows continuously, and its temperature is carefully regulated.

Attempts have been made to reduce the total cycle time by providing auxiliary heating to the mould parts. When the mould parts are not just heated by the in-flowing hot resin, the temperature of the cooling water can be lowered, since the auxiliary heating compensates, during the injection phase, for the lower cooling water temperature. It can therefore still be ensured that the resin fills the cavity completely and that any surface structure is replicated before the resin reaches its glass transition region.

Therefore, due to the lower cooling water temperature, the cooling time needed to ensure that the resin has been solidified may be reduced.

GB, 2081171, A describes an injection moulding machine where the mould parts are heated by induction heating. An inductor is placed in a mould part in the vicinity of the mould cavity surface and is fixed in a hard epoxy resin. A high frequency oscillator is connected to the inductor, such that the inductor heats the mould part during production.

U.S. Pat. No. 4,563,145, A describes a moulding block for manufacturing flat information carriers from thermoplastic material. The moulding block comprises a glass plate, wherein a copper pipe is embedded. The copper pipe can be used both as a cooling channel and an inductive coil. On top of the glass plate, a ferromagnetic material layer is placed, which absorbs some of the energy emitted from the coil. On top of the ferromagnetic layer, a copper layer is placed, having high thermal conductivity. The copper layer conducts the generated heat to a surface layer in the mould part.

Thus, injection moulding machines with inductively heated mould parts have been known for some years, but have not come to a widespread use, as far as the inventors know. There is a trade-off between increased complexity and decreased cycle times. Known solutions have not been efficient enough to compensate for the increased complexity.

SUMMARY OF THE INVENTION

An object of the present invention is to provide an improved injection-moulding device or method.

This object is achieved by means of an injection-moulding device as defined in the appended claims. More specifically, such an injection-moulding device, comprises at least first and second mould parts, defining a mould cavity, wherein at least one of the mould parts comprises heating means, for heating the mould part in the vicinity of a mould cavity surface, said heating means comprising an inductive coil having a plurality of windings and being powered by an oscillator. The mould part comprises a top member, at the mould cavity surface, and, beneath the top member, a carrier member comprising grooves for accommodating said coil windings, wherein the top member resistivity is lower than $1.5*10^{-6}$ $\Omega$m, the top member relative magnetic permeability is lower than 10, the carrier member resistivity is higher than $20*10^{-6}$ $\Omega$m, and the carrier member relative magnetic permeability is higher than 50. In such an injection moulding device, the development of thermal energy, when the coil is powered by the oscillator, is to a great extent concentrated to the top member which adjoins the cavity. The supplied energy may therefore very efficiently heat the mould cavity prior to and during the injection of molten material.

Cooling and heating in the vicinity of a mould cavity here means that supplying and removing of thermal energy takes place close to the mould cavity surface and primarily affects the mould part within a distance of a few, e.g. 2, centimeters from said surface.

The top member relative magnetic permeability is lower than 3.5 or even lower than 1.2 and may comprise an austenitic steel.

The carrier member comprises a composite including soft-magnetic, electrically substantially insulated particles. Such a material fulfils the above defined requirements of resistivity and relative magnetic permeability, and is suitable for machining.

The carrier member magnetic saturation may be higher than 0.40 T, and its electric resistivity may be higher than $2.0*10-3$ $\Omega$m. The carrier member relative magnetic permeability may be higher than 200.

The injection-moulding may be arranged to cool said mould part by conveying a coolant through the grooves. This means that the complexity can be decreased, since separate cooling ducts and coil accommodating means need not be provided.

Such grooves may comprise a plurality of interleaved plane spirals, extending from a centre of the mould cavity surface to the periphery thereof. This provides efficient and uniform cooling of the mould cavity, particularly for circular mould cavity surfaces.

The coil may be wound by placing windings in the grooves and interconnecting these windings by means of return windings, running beneath the carrier part as seen from the cavity surface, such that, at every instant, the currents in coil parts in parallel cooling ducts flow in the same direction. The return windings may then run between the carrier part and a backing member, the backing member having a relative magnetic permeability lower than 1.2, and a resistivity that is lower than the resistivity of the top member. This ensures low losses at the backside of the carrier member.

The object is also achieved by means of a method for injection-moulding, wherein a liquid moulding compound is injected into a cavity, defined by a first and a second mould part, wherein at least one of the mould parts comprises heating means comprising an inductive coil, fed by an oscillator, for heating the mould part in the vicinity of a mould cavity surface during a part of the injection-moulding process cycle. During the heating, a magnetic flux is conveyed by a carrier member, the resistivity of which is higher than $20*10^{-6}$ $\Omega$m and the relative magnetic permeability of which is higher than 50, to a top member, the resistivity of which is lower than $1.5*10^{-6}$ $\Omega$m and the relative magnetic permeability of which is lower than 10, such that the top member is heated by eddy currents. This provides said advantages of the above defined injection moulding device and the method may be varied in a corresponding manner.

The coolant flow may be reduced or even turned off during the phase when the heating takes place. This makes the heating even more efficient.

An information carrier of the optic, magnetic, or magneto-optic type, or a lightguide plate, which is produced by means of an such an injection-moulding device or by means of such a method, will be efficiently produced.

DETAILED DESCRIPTION

Figure 1:
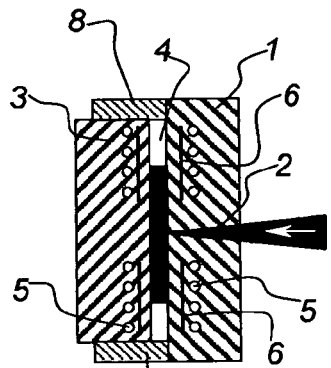
FIGS. 1-4 describe schematically steps in an injection-moulding process.

There will now be described examples of injection-moulding devices.

FIGS. 1-4 describe schematically steps in an injection-molding process utilizing an injection moulding device. More particularly, an injection compression cycle is schematically illustrated.

In the injection-moulding device, a first mould part 1 is fixed and comprises a resin injecting nozzle 2, which is fed by an extruder. Together with a second, moveable mould part 3 and a sub-part 8 on the second moveable part 3, the first mould part forms a cavity 4. The first and second mould parts further include means, in the form of coolant ducts 5, for cooling the mould parts in the vicinity of the cavity 4. Additionally, the first and second mould parts 1, 3 include means, in the form of inductor coils 6, for heating the mould parts in the vicinity of the cavity 4.

In the injection step, illustrated in FIG. 1, the heating means 6 are activated so as to heat the mould parts 1, 3 while hot resin is injected into the cavity 4. The first and second mould parts are separated, but the cavity 4 is closed by means of the sub-part 8 on the second mould part 3. An amount of resin, suitable for finally filling the cavity, is injected between the mould parts 1, 3. The sub-part 8 can slide to some extent in the axial direction in relation to the second mould part 3, and may be provided as a ring surrounding the cavity and defining the periphery of the same, such that the resin does not escape through the gap between the mould parts.

Figure 2:
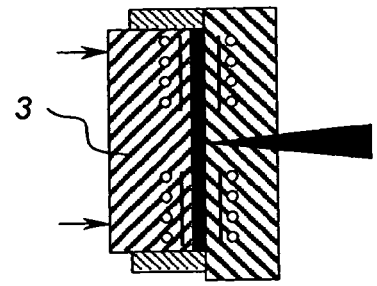

In FIG. 2, the injection phase has been completed, and a clamping force is applied to the second, moveable mould part 3 in order to press the second part 3 towards the first mould part 1. This serves to make the resin fill the cavity entirely and to replicate any surface structure e.g. on the second mould part 3 on the corresponding surface of the injected resin. The injected resin takes up the greater part of the applied force, thanks to the sub-part 8. The second mould part moves slightly towards the first mould part also after the cavity is completely filled to compensate for the shrinking of the resin as the resin gets cooler. The heating of the mould may be switched off before or during this phase of the cycle.

Figure 3:
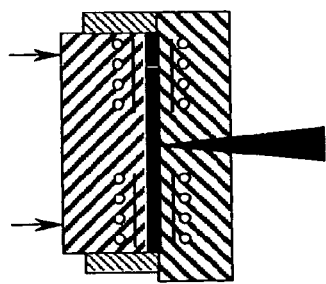

In FIG. 3 the resin is cooled by the coolant, which may flow continuously through the ducts throughout the process cycle. The clamping force is still applied during this phase.

Figure 4:
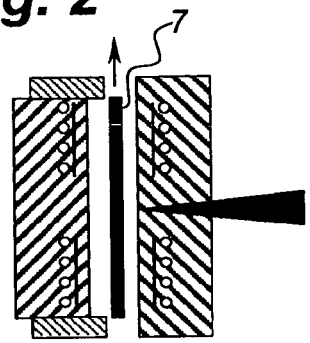

In FIG. 4 finally, the produced object 7 has reached a temperature that is low enough to remove the object from the cavity. The mould parts are therefore separated to make the cavity accessible, and the produced object is removed. Already at this stage the heating of the mould parts may be resumed to prepare the mould for the next production cycle.

The above described cycle may be called "injection compression" and is useful e.g. for the purpose of replicating fine surface structures on a finished product. The invention to be described would however also be useful for so-called "straight injection" cycles, where the mould parts are in a fully closed state, with applied clamping force, as the resin is injected, and no particular clamping step is used. No sub-part 8 as in FIGS. 1-4 is thus needed, and the cavity may be defined entirely by the forms of a first and second mould part. The shrinking may then be compensated for by means of resin injected by the extruder to which the nozzle is connected.

In the disclosed example, active heating of the mould part/s takes place. In general, active heating allows shorter cycle times, production of thinner structures with greater surfaces, cooling channels closer to the cavity surface or thermally quicker materials, both in terms of thermal conduction and specific heat, close to the cavity surface.

The present invention relates to means and methods for providing heating and/or cooling in an injection moulding process of the above indicated kinds. However, such means and methods may in many cases also be applicable to slightly different injection moulding processes. It should be noted also that injection-moulding devices where only one of the mould parts are heated and/or cooled are conceivable within the scope of the invention. It is also possible to use two moveable mould parts. Matrices for forming fine surface structures may be used in either or both of the mould parts.

A description will now be given of a mould part that is well adapted to provide both efficient heating and cooling. The following description relates to a mould part of the second type, i.e. a movable mould part. However, a mould part of the first, fixed kind provided with an injection nozzle can be provided with very similar means for heating and cooling of the mould part. In an injection-moulding device where two such parts are used, the total cycle time for producing a DVD-R substrate has been substantially reduced.

Figure 5:
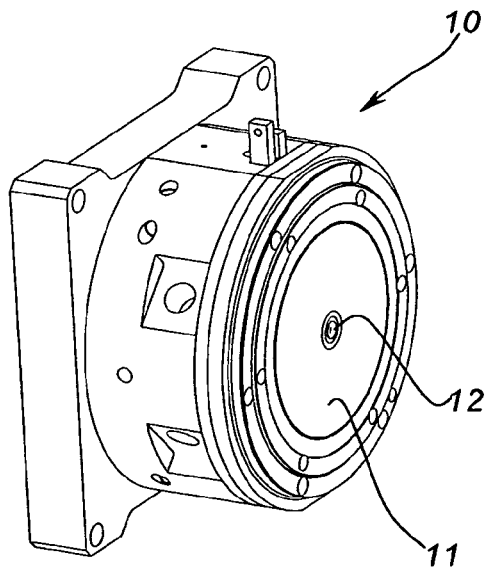
FIG. 5 shows a perspective view of a mould part.

FIG. 5 shows a perspective view of a mould part, intended for the production of DVD-R substrates. More specifically, a moveable mould part 10 is shown, having a circular cavity surface 11 and a punch 12 in the centre of the cavity surface. The punch 12 is used to create a through-hole in the finished object, by advancing the punch towards the fixed mould part, which may have a corresponding recess.

Figure 6:
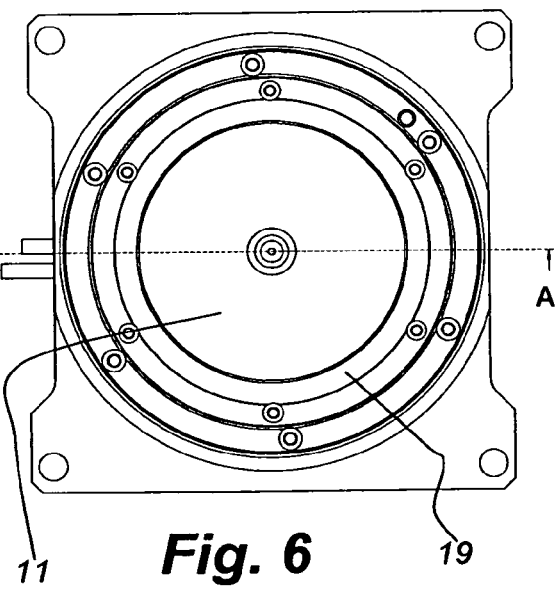
FIG. 6 shows a front view of a mould part as seen in the normal direction of a cavity surface.

FIG. 6 shows a front view of the mould part in FIG. 5 as seen in the normal direction of a cavity surface 11. It is primarily the cavity surface 11 that should be heated and cooled by the heating and cooling means, respectively, in the mould part. The cavity surface is limited by a ventilation ring 19. The ventilation ring, corresponding to the sub-part 8 in FIGS. 1-4, serves the purpose of allowing air in the cavity to escape when the resin is injected. Moreover, the ventilation ring 19 is, as will be described later, somewhat moveable in the axial direction. The axial direction is here defined as the normal direction of the cavity surface, which is flat. The axial direction is also the direction in which the moveable mould part moves as the cavity is opened. This allows the clamping force, e.g. as illustrated in FIG. 2, to be applied continuously as the injected resin cools off and shrinks.

Figure 7:
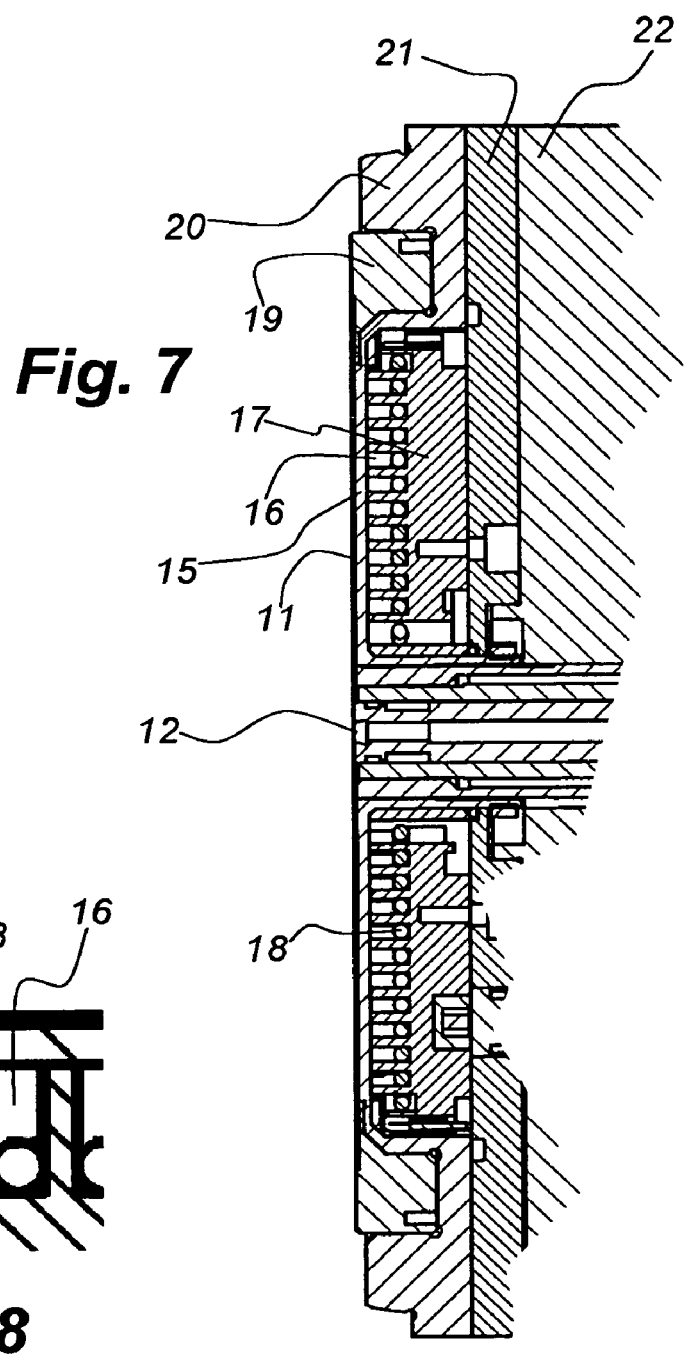
FIG. 7 shows a cross-section A-A through the mould part in FIG. 6.

FIG. 7 shows a cross-section A-A through the mould part in FIG. 6. The punch 12 is situated in the centre of the mould part. The mould part comprises a top member 15, which presents the cavity surface 11. The top is herein defined as the region closest to the cavity, irrespective of the orientation of the mould parts in an actual injection-moulding machine. The top member 15 is to be heated before the resin is injected into the mould cavity. The top member 15 is substantially flat in the area of the cavity and may be solid or comprise different sub-layers, such as a matrix layer adjoining the mould cavity and containing a surface structure as mentioned earlier.

As illustrated in FIG. 7, the top member has an integrated peripheral outer part 20, outside the cavity region. This peripheral part 20 comprises a groove surrounding the cavity region, in which groove the ventilation ring 19 is placed.

Beneath the top member 15 in the area of the cavity surface 11, cooling ducts 16 are situated. As illustrated, these ducts may be provided as machined grooves in a carrier member 17, which grooves are facing the top member and are sealed by the top member 15 to form elongated ducts, running in a plane beneath the top member 15. The grooves may be machined in the carrier member 17. As an alternative to machined grooves, the grooves could be provided as a base structure with separate wall portions attached thereon. An injection-moulding device is thus conceivable where the carrier member is not solid.

Beneath the carrier member 17, a backing member 21 is situated. In the illustrated injection-moulding device, the carrier member extends, in the peripheral direction, only about as far as the cavity surface 11. Therefore the backing member 21 adjoins the outer part 20 of the top member outside the carrier member 17. Beneath the backing member 21, a base member 22 is situated. As is visible in FIG. 6, the top member may be attached to the base member by means of bolts outside the ventilation ring. The backing member 21 and the base member 22 will later be given a further explanation.

As illustrated in FIG. 7, the ducts not only contain the coolant but also different winding turns of a flat inductive coil 18. This coil is fed by a high frequency oscillator, operating in the kHz range, and generates eddy currents which heat the mould part at points of time in the injection-moulding process cycle where heating of the mould part is preferred. Sealings are provided where the windings enter the ducts to avoid leakage of coolant.

Figure 8:
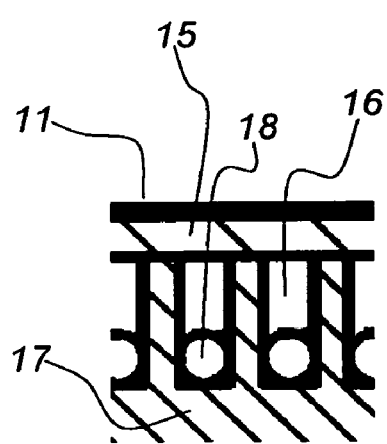
FIG. 8 shows an enlarged portion of the cross-section in FIG. 7, at the cavity surface.

An enlarged portion of the mould part close to the cavity surface 11 is illustrated in FIG. 8. As illustrated, the cooling ducts may have a cross section, the depth of which, as seen from the cavity surface, is greater than the width. In the illustrated injection moulding device, each cooling duct is 2.5 mm wide and 6.2 mm deep. The spacing between coil turns is 4.0 mm. The coil is situated on the bottom of the duct 16, thus leaving room on top of the coil for flowing coolant. The coolant may substantially fill the remaining volume in the duct, which ensures that the coolant remains in contact with the top member 15, thus efficiently dissipating heat therefrom. Various liquid coolants are conceivable, such as water.

Since the ducts 16 are provided as grooves in the carrier member 17, this member both carries the coil 18 at the bottom of the duct, conveys the coolant, and provides an axial support to the top member 15, i.e. takes up forces from the top member.

Even though the ducts 16 illustrated in FIG. 8 have rectangular cross-sections, this is not a requirement. The ducts may e.g. have V- or U-shaped cross-section. The size of the cross-section, and/or the relationship between depth and width may also vary between different ducts and over the length of a duct, thus varying e.g. the coolant flow velocity. It is thus possible to design the ducts in order to provide a desired cooling profile over the mould cavity surface. It is also possible to vary the cooling duct spacing, and in principle to provide a part of the duct as a groove in the top member surface that faces the carrier member 17.

The carrier member 17 provides, together with the top member 15, a magnetic circuit, extending around each coil turn. This magnetic circuit leads a major part of the oscillating magnetic flux generated by the coil 18. The top member and the carrier member may be in contact with each other.

Advantageously, a large proportion of the thermal energy, generated by the eddy currents that are induced by the oscillating magnetic field, is developed in the top member 15 which is closest to the cavity surface. This feature can be achieved by providing, in the carrier member 17, a material with high resistivity (e.g. $2.5 \times 10^{-3}$ $\Omega$m) and high relative magnetic permeability (e.g. $\mu_r = 300$). An example of such a material is Permedyn™ MF1, which is a soft magnetic composite, including soft-magnetic electrically insulated particles. Wall parts between adjacent grooves in the carrier member may be dimensioned under consideration of the saturation level of the used material. The MF1 will saturate at about 1.5 T, but the geometry of FIG. 8 allows saturation levels as low as 0.40 T in the used application.

The top member may consist of a material with substantially lower resistivity, such as an austenitic stainless steel. This material may have a low ($\mu_r$<10) relative magnetic permeability, such that the skin effect can be suppressed, i.e. it can be avoided that most of the thermal energy is developed at the lower top member surface, facing the cooling ducts. The carrier member 17 thus conveys the oscillating magnetic field to the top member 15 where a large proportion of the thermal energy is developed.

Figure 9:
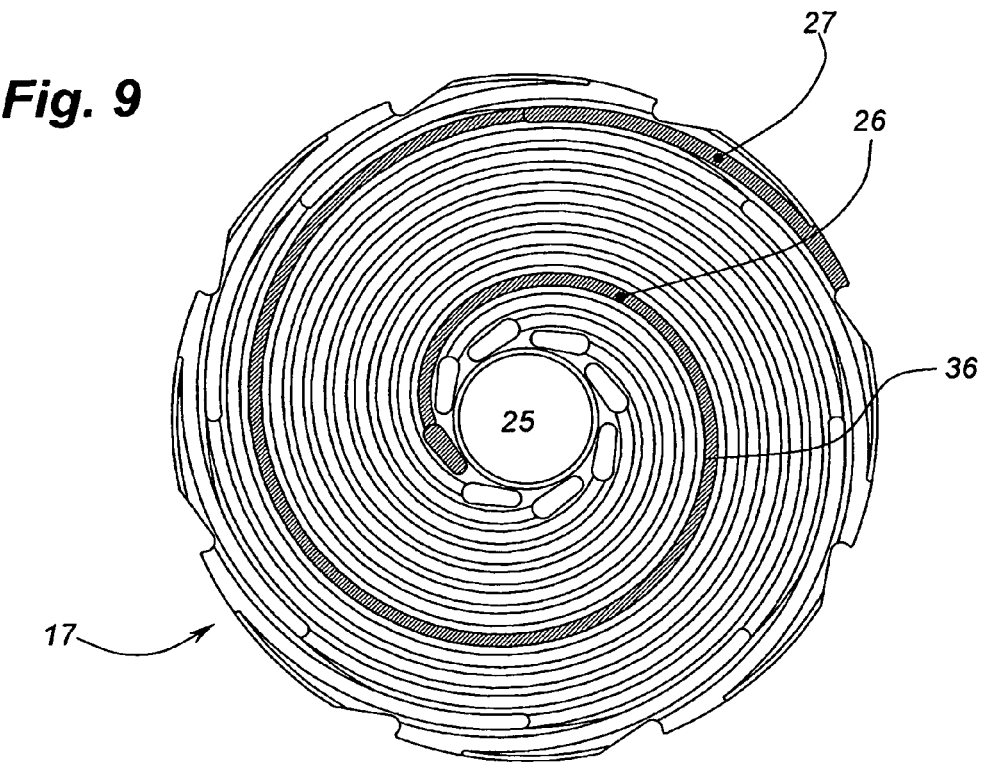
FIG. 9 shows a front view of an uncovered carrier member.

FIG. 9 illustrates a front surface of an uncovered carrier member 17 as seen from the cavity surface. An exemplary cooling duct groove 36 is hatched in the drawing. The described injection-moulding device is intended to produce disc-shaped information carriers such as DVD-R substrates. The carrier member 17 is therefore circular with a central opening 25 that gives room for the punch. As shown in FIG. 9, the carrier member 17 comprises eight grooves in the form of interleaved plane spirals. By interleaved spirals is meant that the spirals enclose each other, such that, between two consecutive turns of one spiral, a number of (or at least one) other spirals are situated. E.g. between the two points 26, 27 of the hatched spiral groove 36 in FIG. 9, grooves corresponding to seven other spirals are situated. As illustrated by the exemplary hatched spiral in FIG. 9, the spiral may be formed as an Archimedean spiral. From the inner opening of the spiral to the outer opening thereof the spiral runs about one and one half turn around the central opening 25.

An Archimedean spiral is a plane curve which can be generated by a point moving, at a constant rate, away from a fixed point, while its radius vector, from the fixed point, rotates at a constant rate.

The coolant need not flow with a continuous flow rate. It is thus possible to switch the coolant flow off completely or partially when the mould parts are heated by the heating means. This may be done by means of a valve. When the heating is switched off and the mould part is to be cooled, the coolant is injected into the inner opening of each duct 16. In a circular mould with a circular central opening, the inlets may be evenly distributed over the periphery of the opening, and similarly, the outlets may be evenly distributed over the outer periphery. As an alternative, the inlets may be placed at the outer periphery, and the outlets at the central opening. As a third option some ducts may have their inlets at the central opening while other have their inlets at the periphery.

Figure 10:
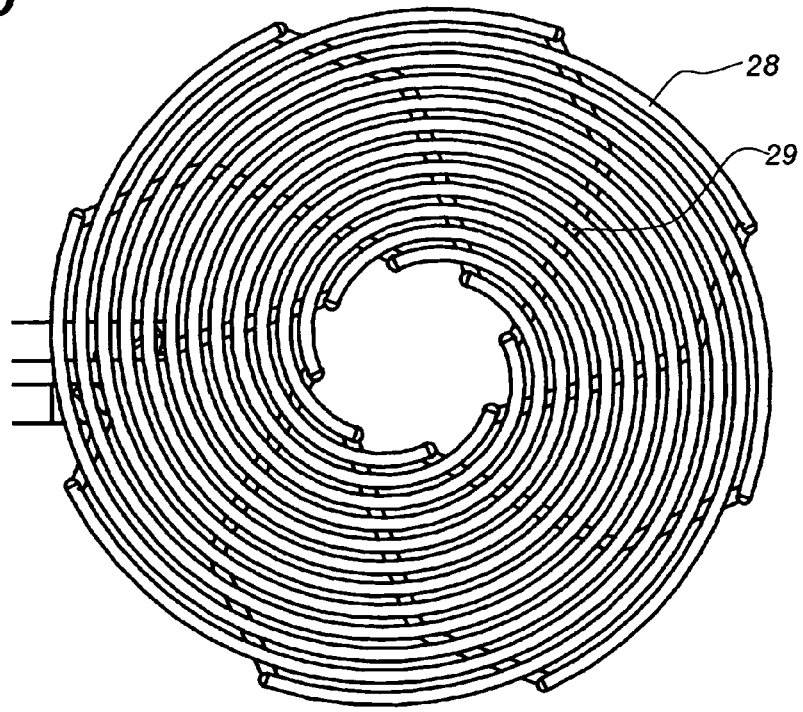
FIG. 10 shows an uncovered winding structure as applied in a carrier member of the type illustrated in FIG. 9.

FIG. 10 shows an uncovered winding structure as applied in a carrier member 17 of the type illustrated in FIG. 9. As illustrated, the coil can be provided as a number of, in the illustrated case eight, winding turns connected in series. A turn, e.g. 28, is placed in the groove 36 of a cooling duct 16, and the turns are interconnected by return windings 29 on the backside, as seen from the mould cavity surface, of the carrier member 17. Thanks to the use of series-coupled turns the used current can be substantially lower as compared to a hypothetical case where the windings in the grooves would be connected in parallel. Thanks to the use of spirals in the front part of each winding turn, these front parts may be considerably longer than the return windings, in the illustrated case more than five times longer.

Thanks to the return windings, the current in all winding turns 28, placed in grooves in the carrier part, may at each instant be directed uniformly, i.e. either counter-clockwise towards the centre of the carrier part or clockwise towards the periphery thereof. This means that the winding turns cooperate to produce a uniform and oscillating flow at the top member in FIG. 7.

Of course, the spirals may be directed in the opposite direction compared to FIG. 9, such that a groove runs from the centre part towards the periphery in the counter-clockwise direction.

The coil windings may comprise solid conductors, but as an alternative so-called litz wires, i.e. wires comprising a plurality of individually insulated sub-conductors, which are joined at their ends. This provides reduced skin-effect losses in the windings thanks to a greater surface area of the conductors.

As is evident from FIG. 8, it is possible to have more than one winding turn in each cooling channel. This may be done by providing deeper grooves, even though already the grooves of structure disclosed e.g. in FIG. 8 may be deep enough to carry two winding turns in each groove. This would provide an even greater magnetic flux for a given current, or a lower current for a given magnetic flux.

In the illustrated injection-moulding device, the coil is fed with a 40 kHz 25 kW impulse, which allows the temperature in the top member to rise e.g. from 40° C. to 140° C. in 1.0 second. As regards the used frequency there is a trade-off between low skin effect in the top member and a uniform heating effect over the cavity surface. If the frequency is too high, the skin-effect in the top plate may be pronounced, i.e. a great part of the eddy currents may be induced near the lower top member surface, thus heating the coolant in the cooling ducts more than the cavity surface. On the other hand, if the frequency is too low, the mid part, i.e. a circular annular part between the outer peripheral part of the cavity surface and the centre part of the cavity surface, will be heated to a greater extent than these latter parts. This may impose problems in applications where uniform heating is important. In the illustrated example, where the top member is comprised by an 1.5 mm plate in the region of the cavity surface and is made of an austenitic stainless steel, and where the injection-moulding machine is used in the manufacturing of DVDs, a frequency within the range from 20 to 60 kHz provides good results in terms of yield. This range may however be changed with a different top member composition and/or a different application.

The return windings 29 illustrated in FIG. 10 may be given some attention, even though they are much shorter than the front part of each turn that run in the carrier member grooves. Returning to FIG. 7, these return windings run between the carrier member 17 and the backing member 21. This backing member 21 may consist of a highly electrically conductive material plate with low relative magnetic permeability, e.g. a copper alloy such as "AMPCOLOY 940". This ensures a low level of undesired inductive heating in this portion of the mould part. To avoid losses at the return windings the backing member may have a lower resistivity than the top member 15.

The mould part members should exhibit the respective specified resistivities and magnetic permeabilities, as described hereinbefore, within the temperature ranges that such mould part members experience during a process cycle, the highest temperatures being developed during such a process cycle at close proximity to the mould cavity. These temperature ranges may vary depending on the used resin, but for commonly used resins the upper limit is at most 350° C.

The backing member 21 and the top member 15 may be in galvanic contact, electrically connected at the central opening 25 and at the periphery of the carrier member 17. This closes the eddy current loops in the third dimension and avoids any risk of the build-up of excessive voltages at these locations due to the applied oscillating field.

The base member 22, placed beneath the backing member 21 may then comprise e.g. a regular mould tool steel such as "Stavax ESR", and will not be inductively heated to any greater extent by the return windings. Of course, other ways of avoiding losses at the return windings are possible, e.g. to provide an insulating backing member with low relative magnetic permeability.

Figure 11:
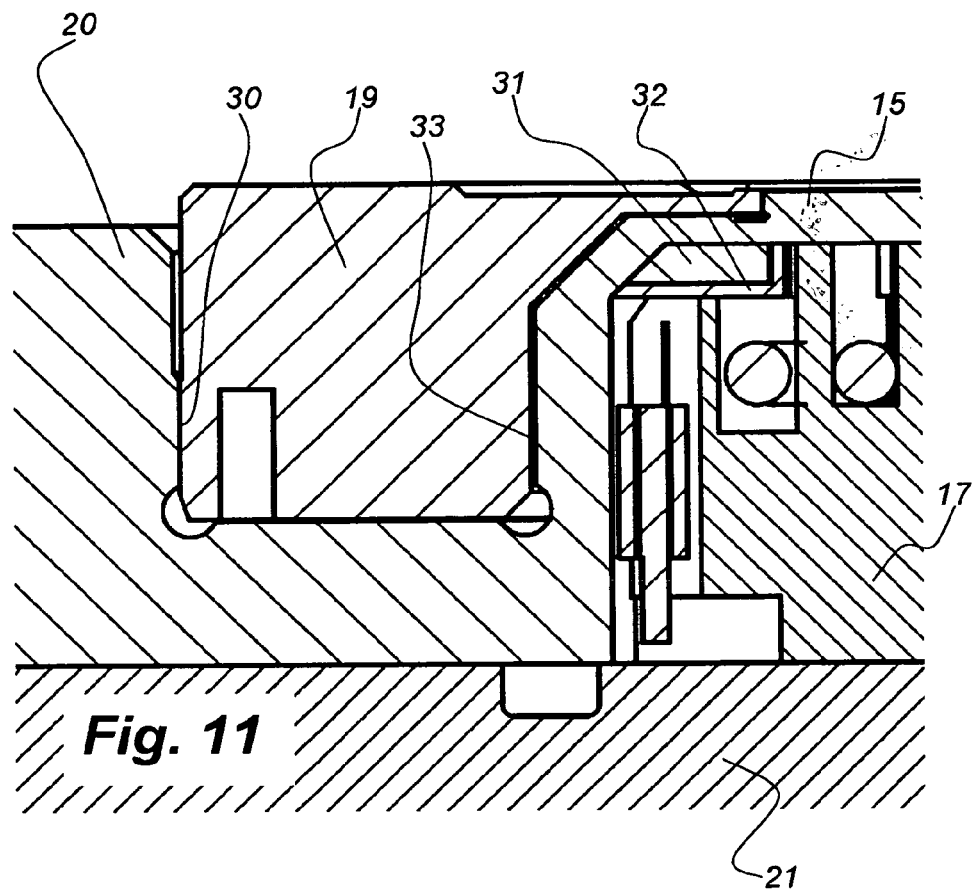
FIG. 11 shows an enlarged portion of the cross-section in FIG. 7, at the periphery of the cavity surface.

FIG. 11 shows an enlarged portion of the cross-section in FIG. 7, at the periphery of the cavity surface. As mentioned, the ventilation ring 19 is placed in a circular groove in the peripheral part 20 of top part 15, at the periphery of the cavity surface. The ventilation ring 19 is to some extent moveable in the axial direction in relation to the top part, i.e. in the normal direction of the cavity surface 11, as mentioned earlier. In the described injection-moulding device, a guiding surface 30 at the outer periphery of the ventilation ring 19 is used to guide this movement. This outer surface is thermally affected by the heating of the cavity surface to a lesser extent as compared to a case where a guiding surface on the inner side of the ventilation ring would be used. At the inner side of the ventilation ring 19 there is instead a gap 33 between the ventilation ring and the groove wall, allowing some thermal expansion.

In order to reduce heating of the ventilation ring 19 as much as possible, and to focus the inductive heating to the cavity surface 11, a shield ring 31 is placed beneath the top part 15 at the periphery of the carrier part. This shield ring may be produced in a material similar to the material in the carrier part 15, i.e. a material that conveys the magnetic flux without being susceptible to large eddy currents. The shield ring thus leads the magnetic flux past the ventilation ring 19 to a great extent. A low magnetic permeability layer, such as an air gap 32, may be provided between the carrier member 17 and the shield ring 31. In many applications the shield ring is not necessary.

Figure 12:
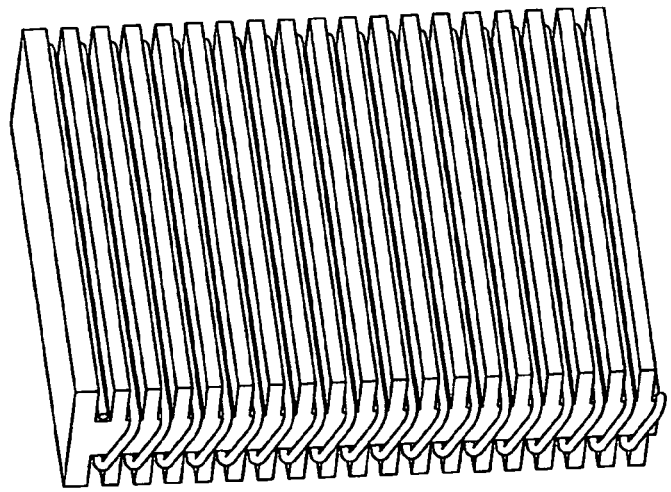
FIG. 12 illustrates a case with a rectangular carrier member.

FIG. 12 illustrates a case with a rectangular carrier member that can be used in an injection-moulding device e.g. for producing lightguide plates. As illustrated, the carrier member may then comprise a plurality of straight grooves, running from one edge to an opposing edge. The coil may be wound with return windings on the backside of the carrier member. The current in all windings in the front grooves at all instants flow in the same direction, i.e. from a first edge towards a second edge.

The above description of an injection-moulding device involves a number of technical solutions which, both per se and in combination with each other, may be used to provide an improved injection-moulding device.

One solution relies on the understanding that a cooling duct may also be used to carry the winding turns of an inductor coil, which is used to heat the mould part in the vicinity of a mould cavity. The coil windings are thus placed in the cooling duct grooves. This feature provides a less expensive structure as compared to a case where separate means would be provided for carrying an inductive coil. This feature thus per se provides an improved injection-mould device, regardless e.g. of the plane shape of the cooling ducts or the materials used. However, this feature is well suited for combination with other features as described above.

Another solution relies on the understanding that a magnetic circuit of the above described type serves to focus the development of the thermal energy to the top layer, closest to the mould cavity. Thus, in general, in a first part of a magnetic circuit surrounding the coil windings, a first material with high magnetic permeability and high resistivity is used. In a second part, where the development of the thermal energy is desired, a material with lower resistance is used such that eddy currents may be generated in this part.

In more detail, the first material, which is used in the carrier member in FIG. 8, may have a resistivity ($\rho$) higher than $20*10^{-6}$ $\Omega$m. Then a loss around 50% would be experienced, which may be allowed in some applications. Even better, a material with a resistivity higher than $2.0*10^{-3}$ $\Omega$m may be used, which gives considerably lower losses. The relative magnetic permeability ($\mu_r$) may be higher than 50 or, even better, higher than 200. The magnetic flux saturation level may be 0.40 T or higher, but lower saturation levels may sometimes be allowed due to the geometry.

There are some materials that fulfill this requirement. Soft magnetic composites have already been mentioned. E.g. some ferrite materials are also possible.

In more detail, the material used in the second part, where the thermal energy is to be developed, may be chosen to have a resistivity lower than $1.5*10^{-6}$ $\Omega$m allowing substantial eddy currents to flow. However, it may be a good idea to have a resistivity higher than the resistivity of the backing member 21 if any. A reasonable resistivity also distributes the eddy currents deeper into the top member 15 as seen from the carrier member 17. The material may be non-ferromagnetic, since a ferromagnetic material would be influenced by skin effect to a great extent, thus concentrating the heat development to the lower surface of the top member. The relative magnetic permeability of the top member should thus be a lot lower than in the carrier member, less than 10 and even better less than 3.5. Some hysteresis effect will always be experienced, but the major part of the heating effect will be generated by eddy currents.

The described example of a stack of materials provides an efficient focusing of the heat development to the region where it is needed, e.g. close to the mould cavity surface. This feature per se thus provides an improved injection moulding-device, regardless e.g. of how the geometric plane shape of the coil is arranged or whether the coil is arranged in a cooling channel. Needless to say however, this feature is well suited for combination with other features described above.

Yet another technical solution relies on the understanding that cooling ducts in the form of a plurality of interleaved plane spirals (extending in a common plane), serve to provide both uniform and efficient cooling of a surface. This is due to the fact that coolant can be allowed to flow more quickly through a set of cooling channels connected in parallel as compared to the case where a single channel is used, covering the entire surface to be cooled. Moreover, the temperature increase between inlet and outlet would be much higher in the latter case. Thus, when a plurality of channels are used, the cooling effect will be more uniform over the surface to be cooled. This is an advantage e.g. when DVDs are produced, since non-uniform cooling may cause tensions and birefringence in the finished product, which leads to lower yield.

The use of plane spirals as cooling ducts ensures that the spacing between adjacent cooling channels may be arbitrarily chosen. At the same time, no sharp turns are needed, which makes it easy to keep the flow rate high. Moreover, cooling duct portions where the flow rate is low and little cooling takes place, i.e. so-called hot spots, can be avoided to a great extent. The use of a plurality of interleaved plane spirals thus per se provides efficient and uniform cooling, and this feature thus provides an improved injection-moulding device regardless e.g. of how, or even if, a heating means is arranged, even though this feature may be combined with such other features.

Another solution relies on the understanding that the heating of a mould part may be improved by turning down the coolant flow when the mould part is heated. The cooling and heating functions may thus work complementary. For instance, switching the inductive heating on and the cooling off may occur as the mould cavity is opened and a finished product is removed. The heating may be switched off and the cooling on at a predetermined time point after injecting the liquid mould compound. The mould part is then more efficiently heated, since less energy is removed by the cooling means during heating. This feature per se or in combination with other features provides an improved injection-moulding device.

Yet another solution relies on the understanding that, in a heated mould part where a ventilation ring is used, this ventilation ring may be guided by a guide surface at the outer periphery of the ventilation ring in order to reduce the risk of jamming of the ring.

The described injection-moulding device may be used for producing a broad variety of products. In general, the described injection-moulding devices is suitable for producing thin structures, typically having a maximum thickness of less than 5 mm, even if the injection-moulding device may also be useful for thicker structures. In general, the device is useful for producing essentially flat objects. In some cases, it may be conceivable to use heating and cooling means only on one part of a mould cavity.

The described injection moulding device is very useful for providing optical information carriers such as DVDs and CDs, where short cycle times are considered important.

Another area where the injection-moulding device is considered useful is for producing lightguide plates (LGPs), used e.g. to backlight LCDs in laptop computers. LGPs are generally flat, but in many cases slightly wedge-shaped, e.g. may be 2 mm thick at one edge and 5 mm thick at an opposing edge (which may be edge-lit by a light source). LGPs also usually include fine structures on a surface to couple out light from the LGP.

The invention is not restricted to the embodiments described above, but may be changed and varied within the scope of the appended claims. E.g. it is possible to apply the above-described features also on moulding processes using other molten materials than resins. Different mouldable plastic materials may be used, typically any thermoplastic resin. Polycarbonate (PC) has already been mentioned as an example. Polymethylmethacrylate (PMMA) is another.

The invention claimed is:

1. An injection-moulding device, comprising at least first and second mould parts, defining a mould cavity, wherein at least one of the mould parts comprises heating means, for heating the mould part in the vicinity of a mould cavity surface, said heating means comprising an inductive coil having a plurality of windings and being powered by an oscillator, characterized in that the mould part comprises a top member, at the mould cavity surface, and, beneath the top member, a carrier member comprising grooves for accommodating said coil windings, wherein the top member resistivity is lower than $1.5*10^{-6}$ $\Omega$m, the top member relative magnetic permeability is lower than 10, the carrier member resistivity is higher than $20*10^{-6}$ $\Omega$m, and the carrier member relative magnetic permeability is higher than 50.

2. An injection-moulding device according to claim 1, wherein the top member relative magnetic permeability is lower than 3.5.

3. An injection-moulding device according to claim 2, wherein the top member relative magnetic permeability is lower than 1.2.

4. An injection-moulding device according to claim 3, wherein said top member comprises an austenitic steel.

5. An injection-moulding device according to claim 1, wherein said carrier member comprises a composite including soft-magnetic, substantially electrically insulated particles.

6. An injection-moulding device according to claim 1, wherein the carrier member magnetic saturation level is higher than 0.40 T.

7. An injection-moulding device according to claim 1, wherein the carrier member electric resistivity is higher than $2.0*10^{-3}$ $\Omega$m.

8. An injection-moulding device according to claim 1, wherein the carrier member relative magnetic permeability is higher than 200.

9. An injection-moulding device according to claim 1, which is arranged to cool said mould part by conveying a coolant through said grooves.

10. An injection-moulding device according to claim 1, wherein said grooves comprise a plurality of interleaved plane spirals, extending from a centre of the mould cavity surface to the periphery thereof.

11. An injection-moulding device according to claim 1, wherein the coil has been wound by placing windings in the grooves and interconnecting these windings by means of return windings, running beneath the carrier part as seen from the cavity surface, such that, at every instant, the currents in the coil parts in parallel cooling ducts flow in the same direction.

12. An injection-moulding device according to claim 11, wherein the return windings run between the carrier part and a backing member, the backing member having a relative magnetic permeability lower than 1.2, and a resistivity that is lower than the resistivity of the top member.

13. Method for injection-moulding, wherein a liquid moulding compound is injected into a cavity, defined by a first and a second mould part, wherein at least one of the mould parts comprises heating means comprising an inductive coil, fed by an oscillator, for heating the mould part in the vicinity of an object cavity surface during a part of the injection-moulding process cycle, wherein during the heating, a magnetic flux is conveyed by a carrier member, the resistivity of which is higher than $20*10^{-6}$ $\Omega$m and the relative magnetic permeability of which is higher than 50, to a top member, the resistivity of which is lower than $1.5*10^{-6}$ $\Omega$m and the relative magnetic permeability of which is lower than 10, such that the top member is heated by eddy currents.

14. A method according to claim 13, wherein the coolant flow is reduced during the phase when the heating takes place.

15. A method according to claim 14, wherein the coolant flow is turned off during the phase when the heating takes place.

16. An injection-moulding device according to claim 2, wherein said carrier member comprises a composite including soft-magnetic, substantially electrically insulated particles.

17. An injection-moulding device according to claim 3, wherein said carrier member comprises a composite including soft-magnetic, substantially electrically insulated particles.

18. An injection-moulding device according to claim 4, wherein said carrier member comprises a composite including soft-magnetic, substantially electrically insulated particles.

* * * * *